United States Patent
Singer et al.

(10) Patent No.: US 9,944,471 B2
(45) Date of Patent: Apr. 17, 2018

(54) DEVICE FOR THE TREATMENT OF INDIVIDUAL SAUSAGES

(71) Applicant: Singer & Sohn GmbH, Berching (DE)

(72) Inventors: Manfred Singer, Berching (DE); Dieter Koller, Sulzbürg (DE)

(73) Assignee: SINGER & SOHN GMBH, Berching (DE)

( * ) Notice: Subject to any disclaimer, the term of this patent is extended or adjusted under 35 U.S.C. 154(b) by 0 days.

(21) Appl. No.: 15/269,109

(22) Filed: Sep. 19, 2016

(65) Prior Publication Data
US 2017/0081133 A1    Mar. 23, 2017

(30) Foreign Application Priority Data
Sep. 21, 2015 (DE) .................... 20 2015 104 994 U

(51) Int. Cl.
*B65G 47/32* (2006.01)
*B65G 47/22* (2006.01)
(Continued)

(52) U.S. Cl.
CPC ............ *B65G 47/32* (2013.01); *A22C 11/008* (2013.01); *B25J 9/0051* (2013.01);
(Continued)

(58) Field of Classification Search
None
See application file for complete search history.

(56) References Cited

U.S. PATENT DOCUMENTS

| | | |
|---|---|---|
| 4,082,177 A | 4/1978 | Aidlin et al. |
| 4,211,055 A | 7/1980 | Long et al. |

(Continued)

FOREIGN PATENT DOCUMENTS

| | | |
|---|---|---|
| DE | 4446437 A1 | 7/1996 |
| DE | 19917435 A1 | 10/2000 |

(Continued)

OTHER PUBLICATIONS

European Search Report for copending European Patent Application 16185676.0-1708 dated Feb. 15, 2017 (8 pages).
(Continued)

*Primary Examiner* — Kavel Singh
(74) *Attorney, Agent, or Firm* — Lucas & Mercanti, LLP

(57) ABSTRACT

A device for treating individual sausages, including:
- a sorting device having an endless conveyor belt traveling around a triangular geometry and having rails or carrier bars, on which belt the sausages, which are loosely deposited onto an ascending run of the belt, are distributed individually into the rails or carrier bars;
- an endless first conveying device with individual rails or carrier bars to accept the sorted sausages, wherein each individual rail or carrier bar accommodates one sausage;
- a grouping device, in which the sausages delivered by the first conveying device are combined into groups;
- a second conveying device with receiving sections, each of which accommodates the sausages of one group, and into which the sausages, lying side by side, are transferred from the grouping device; and
- a transfer device having a gripper device for gripping a sausage group and for transferring and depositing the sausage group into a receiving container.

18 Claims, 9 Drawing Sheets

(51) Int. Cl.

| | |
|---|---|
| *B65G 47/90* | (2006.01) |
| *B65G 17/12* | (2006.01) |
| *B65G 47/06* | (2006.01) |
| *B65G 47/24* | (2006.01) |
| *B65G 47/08* | (2006.01) |
| *B65G 47/52* | (2006.01) |
| *B65G 47/84* | (2006.01) |
| *B65B 19/34* | (2006.01) |
| *B65B 35/36* | (2006.01) |
| *B65B 43/52* | (2006.01) |
| *B65B 5/06* | (2006.01) |
| *B65B 35/24* | (2006.01) |
| *B65B 35/44* | (2006.01) |
| *A22C 11/00* | (2006.01) |
| *B25J 9/00* | (2006.01) |
| *B25J 11/00* | (2006.01) |
| *B25J 15/02* | (2006.01) |
| *B25J 15/10* | (2006.01) |
| *B25J 15/00* | (2006.01) |
| *B65B 35/46* | (2006.01) |
| *B65G 47/14* | (2006.01) |

(52) U.S. Cl.
CPC ....... *B25J 11/0045* (2013.01); *B25J 15/0033* (2013.01); *B25J 15/024* (2013.01); *B25J 15/10* (2013.01); *B65B 5/068* (2013.01); *B65B 19/34* (2013.01); *B65B 35/24* (2013.01); *B65B 35/36* (2013.01); *B65B 35/44* (2013.01); *B65B 35/46* (2013.01); *B65B 43/52* (2013.01); *B65G 17/12* (2013.01); *B65G 47/082* (2013.01); *B65G 47/22* (2013.01); *B65G 47/52* (2013.01); *B65G 47/846* (2013.01); *B65G 47/90* (2013.01); *B65G 47/1471* (2013.01); *B65G 2201/0202* (2013.01)

(56) References Cited

U.S. PATENT DOCUMENTS

| | | | |
|---|---|---|---|
| 5,794,756 A * | 8/1998 | Taylor | B65G 43/10 198/429 |
| 5,810,150 A | 9/1998 | Martin et al. | |
| 5,871,080 A | 2/1999 | Manzi et al. | |
| 6,141,943 A | 11/2000 | Hart et al. | |
| 6,308,816 B1 * | 10/2001 | Bankuty | B65C 9/065 198/377.1 |
| 2013/0020176 A1 | 1/2013 | Manders et al. | |
| 2014/0360137 A1 * | 12/2014 | Richards | B25J 15/0616 53/473 |

FOREIGN PATENT DOCUMENTS

| | | |
|---|---|---|
| EP | 1801044 A1 | 6/2007 |
| EP | 1886772 A1 | 2/2008 |
| EP | 2799349 A1 | 11/2014 |

OTHER PUBLICATIONS

European Search Report in copending European Patent Application No. 16185676.0 dated Mar. 28, 2017 (12 pages).

European Office Action in copending European Patent Application No. 16185676.0 dated Nov. 23, 2017 (4 pages).

* cited by examiner

DEVICE FOR THE TREATMENT OF INDIVIDUAL SAUSAGES

CROSS-REFERENCE TO RELATED APPLICATIONS

The present application claims priority of DE 20 2015 104 994.3, filed Sep. 21, 2015, the priority of this application is hereby claimed and this application is incorporated herein by reference.

BACKGROUND OF THE INVENTION

The invention pertains to a device for the treatment of individual sausages.

In the sausage industry, it is often necessary to group individual sausages and to place them in transport or packaging containers. This is often done by hand; that is, in most cases several people stand at a conveyor belt, on which the separate sausages, prefrozen in some cases, are being transported. The sausages are picked up by hand and then placed in the containers. One person must grip up to 80 sausages per minute and place them in the packaging or receiving containers, which can then be sealed by an appropriately designed packaging machine. This is not only quite complicated but also physically stressful, for the work is usually carried out in a slightly forward-leading position and under a good deal of performance pressure. The low temperature of the often prefrozen sausages also has a disadvantageous effect on this work.

SUMMARY OF THE INVENTION

The invention is therefore based on the problem of providing a device for the treatment of individual sausages which makes it possible to improve the grouping and placement of the sausages in receiving containers.

To solve this problem, according to the invention a device for the treatment of individual sausages is provided, comprising:

a sorting device comprising an endless conveyor belt, which travels around an approximately triangular geometry and which comprises rails or carrier bars, onto the ascending run of which conveyor belt the sausages are loosely deposited and on which they are distributed individually into the carrier bars;

an endless first conveying device with individual rails or carrier bars accepting the sorted sausages, wherein each individual rail or carrier bar accommodates one sausage;

a grouping device, in which the sausages delivered to it by the first conveying device are combined into groups;

a second conveying device with receiving sections, each of which accommodates the sausages of one group, into which sections the sausages, lying side by side, are transferred from the grouping device; and a transfer device comprising a gripper device for gripping a sausage group and for transferring and depositing the sausage group into a receiving container.

The multi-component treatment device according to the invention makes possible the automatic sorting, grouping, and transfer of the sausages into receiving containers. Within the scope of this operation, no manual activities are required; on the contrary, completely automatic operation is possible. Nevertheless, it is still necessary for the sausages to be inspected visually to ensure that they are undamaged.

To achieve this goal, a sorting device is provided, in which the separate sausages, loosely supplied via an appropriate feed device such as a conveyor belt from a hopper, are sorted. To this end, a triangular conveyor belt is provided, on which a plurality of individual carrier bars are provided, one after the other. The loose sausages are discharged onto this conveyor belt, namely, onto an ascending run of the conveyor belt, where they become distributed into the individual carrier bars or rails. In the ideal case, one sausage is introduced into each carrier bar or each rail, wherein, because the sausages, as described, have been deposited loosely, sometimes the one or the other rail or bar remains unoccupied. If, by chance, two sausages end up in one carrier bar rail or in one rail, the extra sausage can be removed by an appropriately designed stripper device.

Via this sorting device, therefore, the separately deposited sausages are sorted and distributed into the carrier bars or rails. These sorted sausages are then transferred from the conveyor belt to an endless first conveying device. This comprises a plurality of successively arranged individual rails or carrier bars, wherein each individual bar or rail is configured to accept one sausage. The conveying device serves to feed the sorted sausages to a downstream grouping device. In this grouping device, the transferred sausages are combined into groups, wherein the size of the group can be parameterized. That is, groups consisting of four, six, eight, or ten sausages can be specified as needed and formed in the grouping device. The size of the groups which are formed depends directly, of course, on the size of the receiving containers.

After the groups have been formed, the sausages are transferred from the grouping device to a second conveying device, which comprises receiving sections, each of which is assigned to a group, i.e., each of which is designed to receive one group. The sausages lie side by side in these receiving sections; that is, they are already precisely oriented and aligned, so that they can be gripped by a transfer device assigned to the second conveying device, this transfer device being equipped with a gripping device, which can thus transfer the sausages to a receiving container. The gripping device grips the complete group of sausages, which are transferred in their entirety. After placement in the receiving container, the container is carried away and sealed as appropriate, for example.

The device according to the invention therefore makes it possible to sort the previously separated, possibly already prefrozen sausages, to group them, and to transfer them without the need for any manual activity. The device is also able without further ado to deal with sausages which may not always have the same product shape—a situation which often occurs with sausages in natural casings. Such sausages often manifest variations in the product dimensions as a result of variations in the diameter of the casing, for example, or as a result of irregularities which develop during the stuffing process or as a result of defects associated with the cutting-off of one link from another. Because a natural casing has the tendency to return to its original curved shape, sausages to be processed sometimes also have a slightly curved shape. None of this presents any problem to the device according to the invention.

Although it is possible to transfer the sausages being carried along by the carrier bars or rails in the sorting device directly to the first conveying device at the end of the descending run of the conveyor belt, it is advisable for this transfer to be accomplished instead at the end of the horizontal run of the conveyor belt. That is, the sausages which have been deposited onto the ascending run of the conveyor belt and sorted travel around a more-or-less complete circuit, wherein the ascending run proceeds in the direction opposite to the basic conveying direction of the device according to the invention. To prevent the sausages from falling out of the carrier bars or rails as they travel from the descending run to the horizontal run, it is advisable to provide a guide device for the sausages held in the carrier bars or rails, which are now open toward the bottom; this guide device is arranged underneath the preferably essentially horizontal run of the conveyor belt to guide the sausages up to the point at which they are transferred to the first conveying device arranged adjacent to the run. This guide device can be, for example, a stationary plate or an endless belt traveling in the conveying direction, which is a good choice when only one sausage is being held on a carrier bar or rail and therefore only one row of sausages is present. The sausages can be transported along this plate or belt without further ado and introduced into the individual rails at the end of the horizontal run.

To increase the throughput, however, it is advisable for the carrier bars or rails of the sorting device to be longer than the sausages to be sorted, so that several sausages—five, eight, or ten sausages, for example,—can be accommodated in one carrier bar or one rail. In this case, it is preferable to provide a pusher device, by means of which the sausages in a carrier bar or rail can be pushed along the carrier bar or rail and thus transferred to the conveying device. The pusher device in this case is arranged underneath the lower, horizontal run of the conveyor belt; that is, the sausages, which are still being held in the carrier bars or rails, lie on this pusher device. The pusher device is, for example, a belt or a corresponding type of strap traveling transversely to the direction in which the conveyor belt is moving; by means of this pusher device, the several sausages in the carrier bars are shifted in a defined manner to one side (the pusher device preferably extending over nearly the entire length of the lower horizontal run). The sausages slide both in the longitudinal and in the transverse direction across this pusher device, but they experience a displacement component predominantly in one defined direction. At the interface between the conveyor belt and the downstream first conveying device, it is always the forwardmost sausage of the row of sausages, i.e., in the forwardmost position relative to the transverse displacement direction, which falls into the associated individual rail. This means that it is always the sausages of this first sausage row which are transferred to the first conveying device, and each individual bar or each rail of the first conveying device is thus filled. The remaining sausages of the individual carrier bar or rail travel around again, i.e., move around and up the ascending run of the conveyor belt. Unless by chance the first position has been occupied by another sausage during the next sorting process, the next time these returning sausages come around they are now pushed forward by the pusher device and can then be loaded onto the first conveying device.

The pusher device, which, as it were, simultaneously forms the guide device, is, as previously described, preferably realized as a belt or strap traveling perpendicularly to the conveying direction of the lower horizontal run. For this purpose, preferably a material such as PU is used, which results in the least possible friction between it and the sausages, i.e., the external layer of sausage material.

As previously described, the sorting device advisably comprises a stripper device to remove extra sausages from a carrier bar or rail. When the sausages are deposited into long carrier bars or rails, one or more sausages will be introduced correctly into the rails, but it can also happen that one or more other sausages will be lying on top of these correctly positioned ones. The stripper device strips these extra sausages away, so that they cannot travel around the top dead center point of the conveyor belt and fall off. A rotating paddle, for example, can be used as a stripper device of this type.

The sorted sausages are then sent to the first conveying device. Although they have already been oriented by the pusher device, which is preferably provided, it is advisable for an orienting device to be assigned to the first conveying device to orient laterally the sausages held in the individual rails. By this means it is possible to orient and position the individual sausages in a defined manner. An orienting device of this type can comprise one or preferably two rotating, gear-like wheels, one on each side of the conveying device; the wheel or wheels have orienting sections which act on the sausages and engage in the rails. The orienting sections of these rotating wheels, which are preferably not actively driven but are instead turned by the conveyor belt, therefore act on the corresponding ends of the sausages and push the sausages, as needed, slightly toward the left or right in the associated individual rail or carrier bar, so that, after the sausages have passed through this orienting device, they have all been positioned with a good deal of precision.

As previously described, the sausages are sent from the first conveying device to the grouping device. Here, defined groups consisting of a parameterizable number of sausages are formed. For this purpose, the grouping device can comprise at least one drum, which can be driven in rotation perpendicular to the conveying direction of the first conveying device; into this drum, the sausages forming a group are delivered by the [first—Tr. Ed.] conveying device, and from this drum the sausages are sent to the associated receiving section of the second conveying device located downstream. Preferably two drums are provided, which are arranged one after the other; although they around the same axis, they can be driven separately. Each drum preferably can be actively rotated and positioned by its own servo drive and can be filled one after the other in this way. Once the one drum has been filled, it rotates into the transfer position, and as this is being done the next drum is brought up into the loading position and filled.

A stationary, arc-shaped guide section is preferably assigned to the drum or drums, wherein the sausages transferred one after the other to the drums now form a row, side by side, between the drum and the guide section. The sausages are therefore not introduced into the drums in what amounts to an end to-end row, but rather they are introduced in a defined arrangement, one next to the other, into a receiving space between the drum and the guide section. This receiving space is defined by the drum, which comprises an arc-shaped external surface and one or more lower and upper radially projecting driver sections, and the arc-shaped guide section. For the receiving step, the drum is positioned so that the receiving section is open and the first sausage falls into it and rests on the lower driver. Then, in succession, the remaining sausages are introduced into this receiving space. Once the desired number of sausages has been loaded, the drum rotates relative to the guide section. The sausages are carried along, wherein the upper driver ensures that they are carried along in a defined manner even if the first or some other sausage is sticking slightly. Guided by the arc-shaped guide section, the sausages are then transferred at the lower outlet to the receiving section of the second conveying device.

It is especially advisable here for the drum to rotate in a stepwise manner during the sausage loading process until all the sausages have been loaded, after which it is rotated further so that the sausages can be unloaded. That is, each time a sausage is added, the drum rotates by an additional defined angle increment until all the sausages have been loaded. To ensure on the one hand that each individual sausage to be loaded is acquired and that this stepwise movement of the drum can be controlled as required, and to ensure on the other hand that the desired number of sausages is reached, it is advisable to assign a sensor to the first conveying device to detect the loading state of the individual rails or carrier bars, wherein the drive of the drum or drums can be controlled as a function of the results of this detection. An appropriate control unit—which preferably controls the operation of the entire device—therefore controls, as a function of the detection by the sensor, the corresponding rotation of the drum. In principle, of course, the control unit, as a higher-level control system, also controls the operation of the other movable components or motors, so that they are coordinated or synchronized with each other with respect to their conveying speed, etc.

As previously described, the arc-shaped guide section preferably leads to a point directly above the second conveying device, so that the individual sausages, arranged side by side, are transferred one by one into the receiving areas of the second conveying device.

Assigned to the second conveying device, finally, is the transfer device, which can preferably be a delta robot. A suspended delta robot of this type consists of three or four offset arm systems, each consisting of an upper and a lower arm. The upper arms are moved as required by separate motors, which are mounted on the base plate. A work plate is arranged in turn on the lower arms, and, in the case of the device according to the invention, the required gripping device is arranged on this work plate. Such delta robots make it possible to move the gripper device, which is moved merely vertically and horizontally, with very high precision, so that it can grip the group of sausages and then transfer it horizontally.

For this purpose, the gripper device comprises four gripping elements positioned in a rectangular arrangement to grip the group of sausages, which has a rectangular outline, wherein at least three of the gripping elements are pivotable. The gripper device is positioned above the sausage group by the delta robot and lowered vertically, after which the at least three, possibly all four gripping elements are pivoted by appropriate drive motors so that they act on the sides of the sausage group and thus grip it. Then the delta robot raises the gripper device slightly, so that the sausage package is removed from the receiving section of the second conveying device, this being followed by a horizontal displacement movement, by which the sausage group is positioned above the receiving container. A short vertical lowering movement places the sausage group in the receiving container, after which the movable gripping elements are pivoted outward again and the process of transferring the sausage group is completed.

So that the sausage group can be reliably and effectively gripped and/or picked up, each of the gripping elements preferably comprises several curved gripping sections. The two gripping elements arranged opposite each other, i.e., the two which grip the ends of the sausages, can have as many of these curved gripping sections as there are sausages. That is, each sausage is, as it were, gripped individually by one these gripping sections, the shape of which is compatible with the shape of the sausage, which ensures that the sausages are carried along reliably. The gripping sections acting on the two outer sausages can also be configured with an appropriately curved shape, so that they, too, can effectively grip the bottom surface of the sausages.

The various features of novelty which characterize the invention are pointed out with particularity in the claims annexed to and forming a part of the disclosure. For a better understanding of the invention, its operating advantages, specific objects attained by its use, reference should be had to the drawings and descriptive matter in which there are illustrated and described preferred embodiments of the invention.

DETAILED DESCRIPTION OF THE INVENTION

Figure 1:
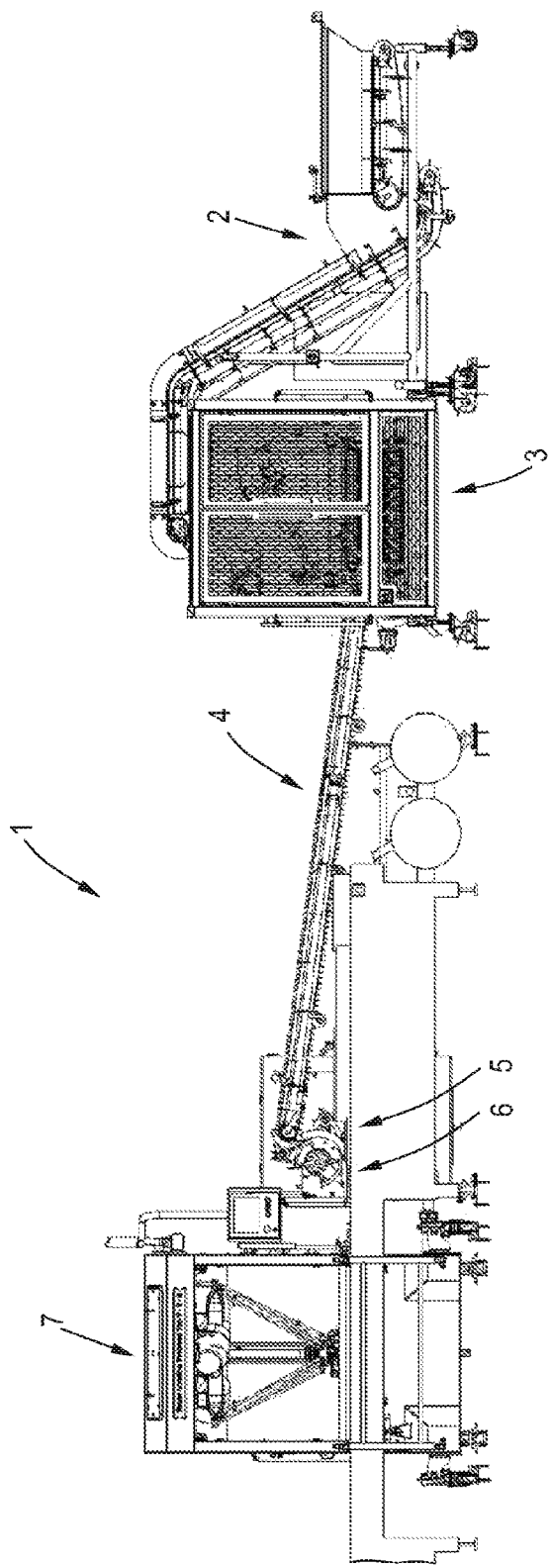
FIG. 1 shows a side view of a device according to the invention.

FIG. 1 shows a device 1 according to the invention for the treatment of individual sausages. The device 1 comprises
a feed device 2;
a sorting device 3 downstream from the feed device;
a first conveying device 4 downstream from the sorting device;
a grouping device 5 downstream from the first conveying device;
a second conveying device 6 downstream from the grouping device; and
a transfer device 7, again downstream.

The individual devices are described in greater detail below. They are preferably controlled by a common control unit. The device 1 makes it possible to sort randomly deposited individual sausages, to orient them, to form groups consisting of a defined number of sausages, and to transfer these groups of sausages to receiving containers.

Figure 2:
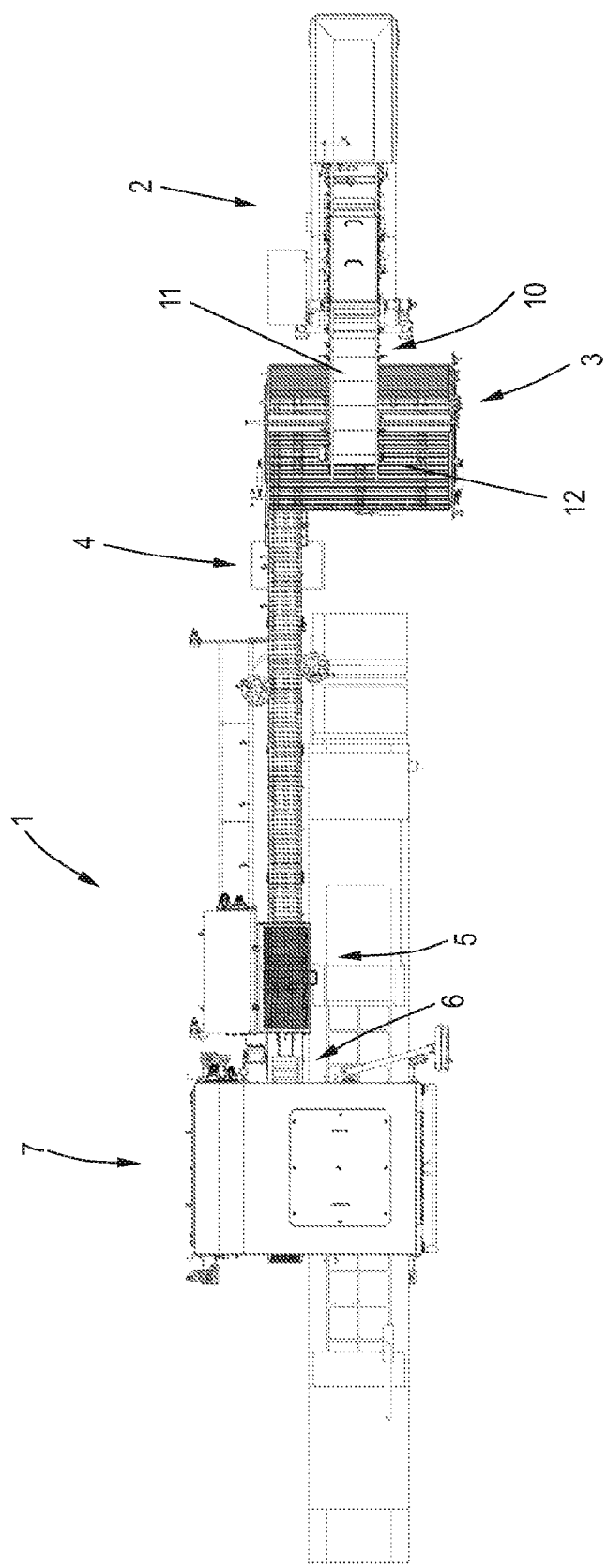
FIG. 2 shows a top view of the device of FIG. 1.

FIG. 2 shows a top view of the device 1 of FIG. 1, in which the individual devices can be seen again.

Figure 3:
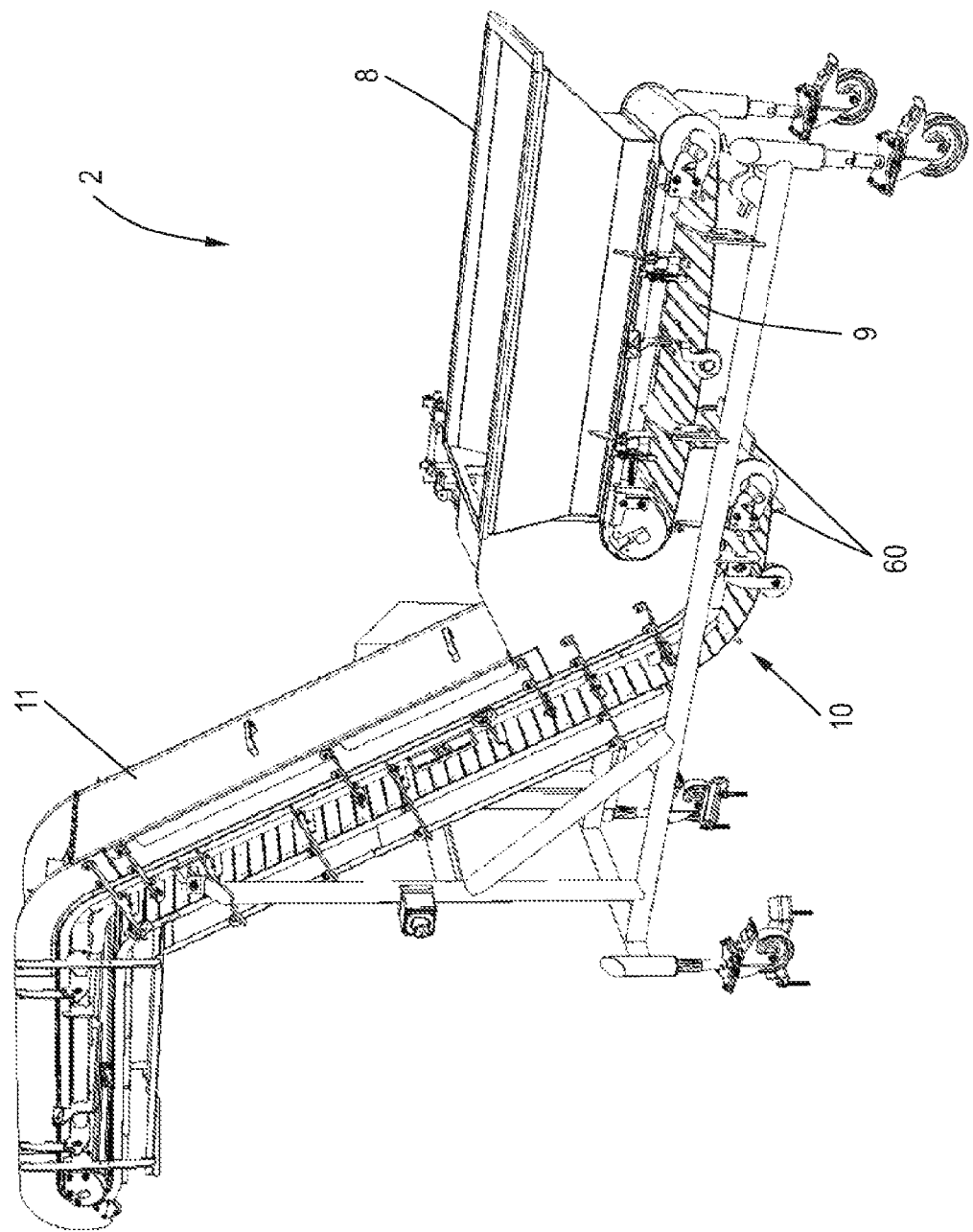
FIG. 3 shows an enlarged view, in perspective, of the feed device upstream from the sorting device.

FIG. 3 shows an enlarged, detailed view of the feed device 2. This comprises a chute 8, into which the separated, loose sausages are loaded. By means of a conveyor belt 9, the sausages are carried away from the chute 8 and placed on a conveyor belt 10, which has suitably adapted rails or carriers 60, so that the sausages can be carried along. The conveyor belt 10 is configured to ascend; its upper end extends to a point above the sorting device 3 (see FIG. 2), so that the sausages falling from the conveyor belt 10 are transferred to the conveyor belt of the sorting device. The feed device 1 comprises a covered transport channel 11; that is, the upper run of the conveyor belt 10 is enclosed, so that the sausages are not exposed as they are being transported, and they are also prevented from falling off.

Figure 4:
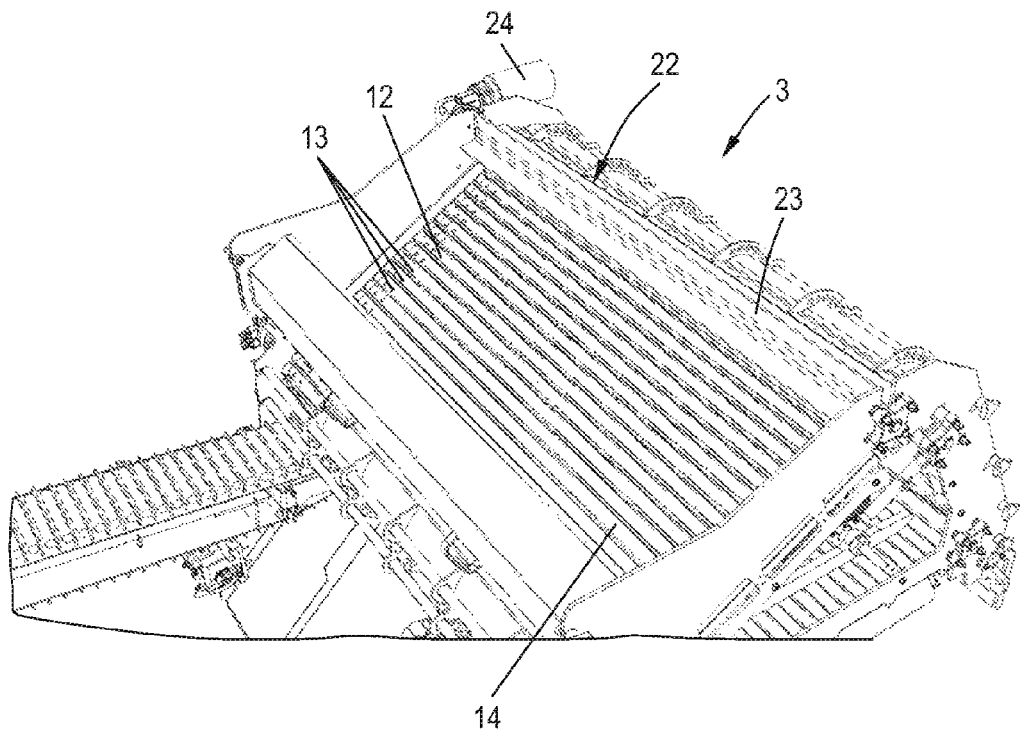
FIG. 4 shows a partial view, in perspective, of the sorting device, showing the run which receives the sausages supplied by the feed device.
Figure 5:
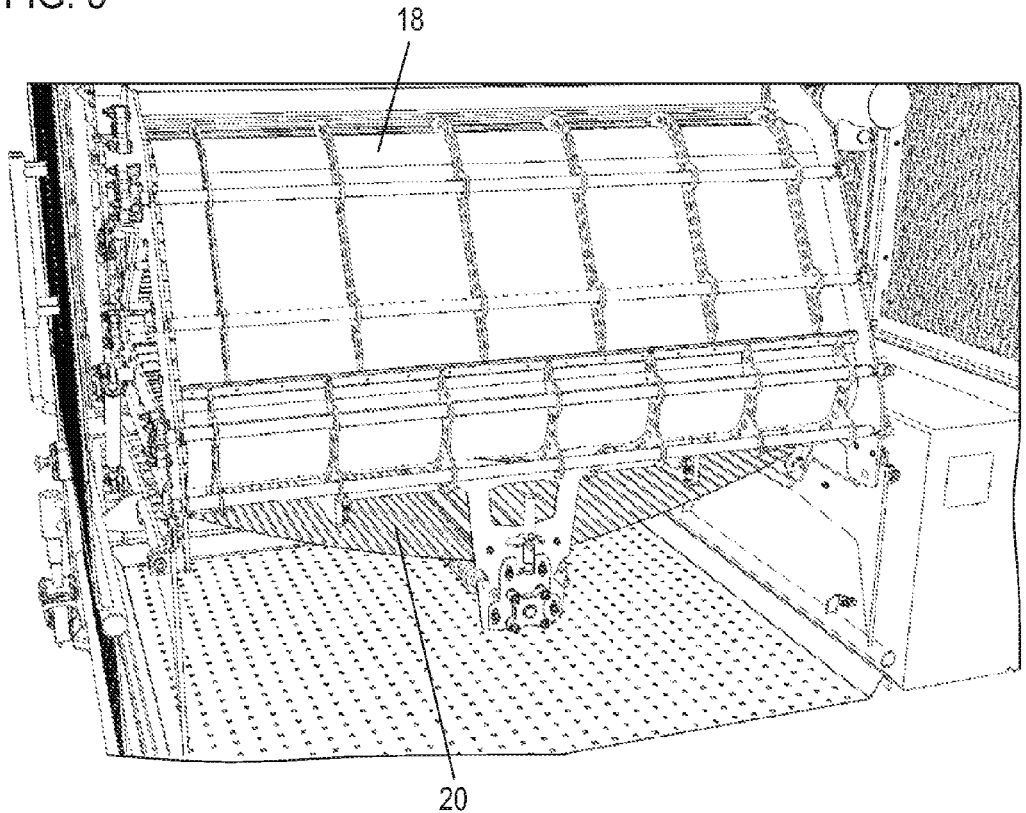
FIG. 5 shows a perspective view of the other side of the sorting device of FIG. 4.

The transported sausages fall onto a conveyor belt 12 of the sorting device 3, shown in FIGS. 4 and 5. The outside surface of the conveyor belt 12 comprises a plurality of individual carrier bars 13, which are considerably longer than the standard length of a sausage, so that more than one sausage—in the example shown here, approximately 8-10 sausages—can be accommodated by one of these carrier bars. In FIG. 2, it is easy to see that the carrier bars 13 of the conveyor belt 12 are much wider than the downstream first conveying device 4, on which the separated sausages are transported further along.

Figure 6:
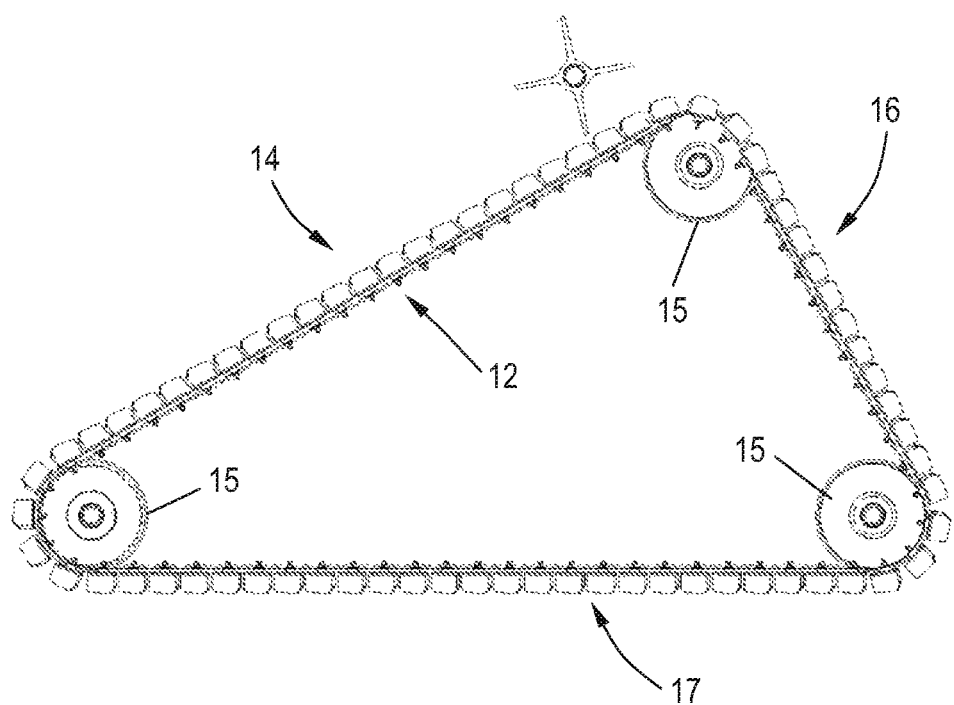
FIG. 6 shows a schematic diagram of the endless conveyor belt of the sorting device, which has a triangular geometry and comprises carrier bars.

The run 14 of the conveyor belt 12 shown in FIG. 4 travels upward; that is, the transport direction of the sausages in the carrier bars 13 is, in the case of this upper run 14, more-or-less opposite to the feed direction. The conveyor belt 12 (see FIG. 6) has an essentially triangular geometry and is guided around three deflection rollers 15. The ascending, upper run 14 is deflected around the upper deflection roller 15 and proceeds in the form of a second upper run 16. This upper run 16 is deflected around a deflection roller 16 at the bottom right and proceeds in the form of a horizontal lower run 17, which passes around the left deflection roller and proceeds as the upper run 14 again.

To prevent the sausages held in the carrier rails 13 from falling out on transition to the upper run 16, a housing 18 is provided on this side (see FIG. 5). This housing is set up close to the conveyor belt 12, i.e., to the upper run 16, so that the sausages cannot fall out. The housing 18 also extends around the deflection area, i.e., around the bottom-right deflection roller 15, so that, there, too, the sausages are guided safely. Underneath the horizontal lower run 17 (see FIG. 7), a pusher device 19 comprising a pusher belt or a pusher strap 20 is provided, which serves as a support on which the sausages can rest; they therefore cannot fall out of the carrier bars 13 of the lower run 17, which are open at the bottom, as FIG. 7 clearly shows. In addition, the pusher device serves to push the sausages 21 shown in FIG. 7 toward the side of the conveyor belt 12 on the right relative to the conveying direction. That is, the conveying direction of the pusher belt 20 is perpendicular to the conveying direction of the conveyor belt 12. The sausages 21 slide over the pusher belt or pusher strap 20, which is preferably made of PU. This pusher device 19 ensures that the sausages 21 are moved continuously toward the right side of the conveyor belt 12, which leads immediately to the first conveying device 4 (see FIG. 2), so that a smooth transfer can occur there.

As previously described, the sausages are deposited randomly by the feed device 2 onto the upper run 14 of the conveyor belt 12. They arrive with any possible orientation on this belt. Many sausages drop directly into a carrier bar 13; many lie crosswise to the bars; and sometimes sausages lie on top of each other, etc. To strip off the sausages, a stripper device 22 is provided, comprising a rotatable paddle 23, driven by a drive motor 24. The paddle rotates in the direction opposite to that of the upper run 14, so that sausages not correctly loaded into a carrier bar 13 are stripped off in a downward direction and then ideally drop into another carrier bar 13. Independently of that, insofar as the sausages are correctly positioned in the individual carrier bars 13, the pusher device 19, i.e., the conveyor belt or conveyor strap 20, ensures that all of the sausages are moved toward the right rear side of the conveyor belt 12. Provided that the conveyor belt or strap 20 is traveling at an appropriate speed, the length of the lower run 17 is sufficient to ensure that, even if some of the sausages are situated in a middle or toward the left side, they will all be moved to the right side. In most cases, several sausages will already be positioned in a carrier bar 13, so that the displacement distance will not be excessive.

Figure 7:
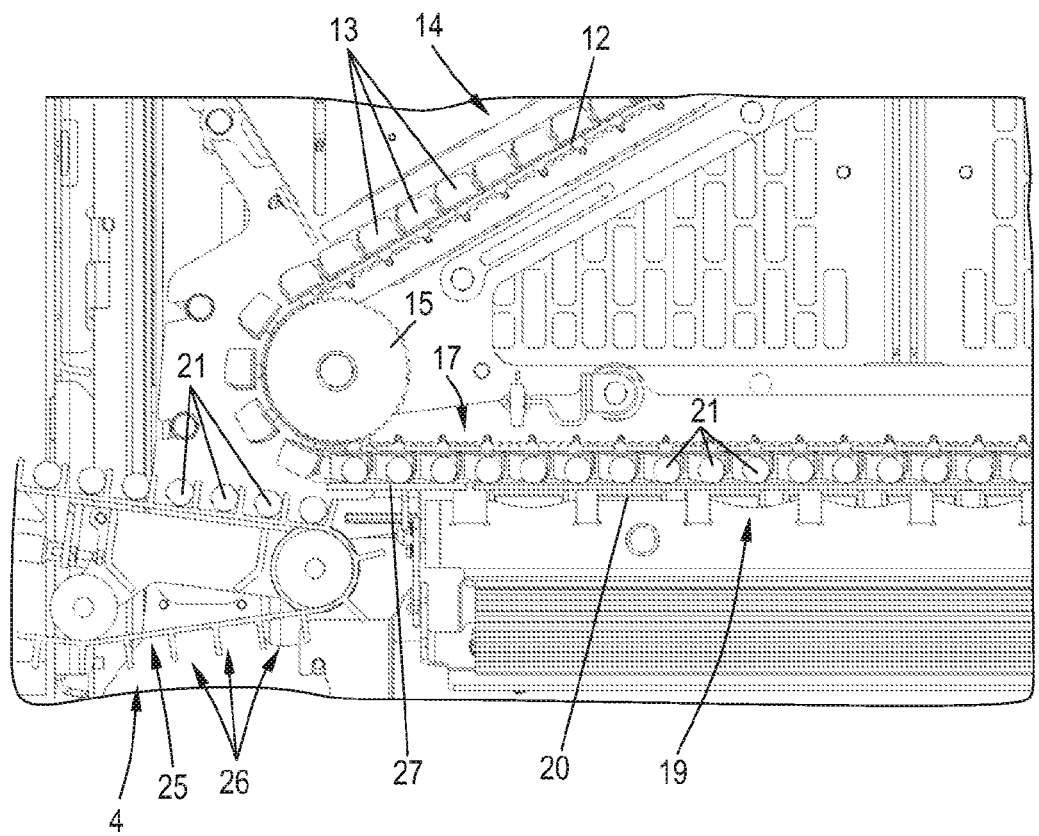
FIG. 7 shows an enlarged, detailed view of the transfer area where the sausages are transferred from the conveyor belt of the sorting device to the first conveying device.

FIG. 7 shows the area where the sausages 21 are transferred from the sorting device 3 to the first conveying device 4. The first conveying device 4 comprises an endless conveyor belt 25 with a plurality of individual rails 26, as FIG. 7 clearly illustrates. Each individual rail serves to hold an individual sausage 21. After they have been oriented and then correctly positioned by the pusher device 19, the sausages 21 are conveyed to the transfer point by the conveyor belt 12. From the conveyor belt or strap 20, the sausages 21 arrive on a transfer plate 27, the length of which is calculated so that it ends precisely above an individual rail 26, as FIG. 7 shows. Because the conveying speed of the conveyor belt 12 and the conveying speed of the conveyor belt 25 are synchronized with each other, it is ensured that a falling sausage 21 will drop precisely into an individual rail 26.

Figure 8:
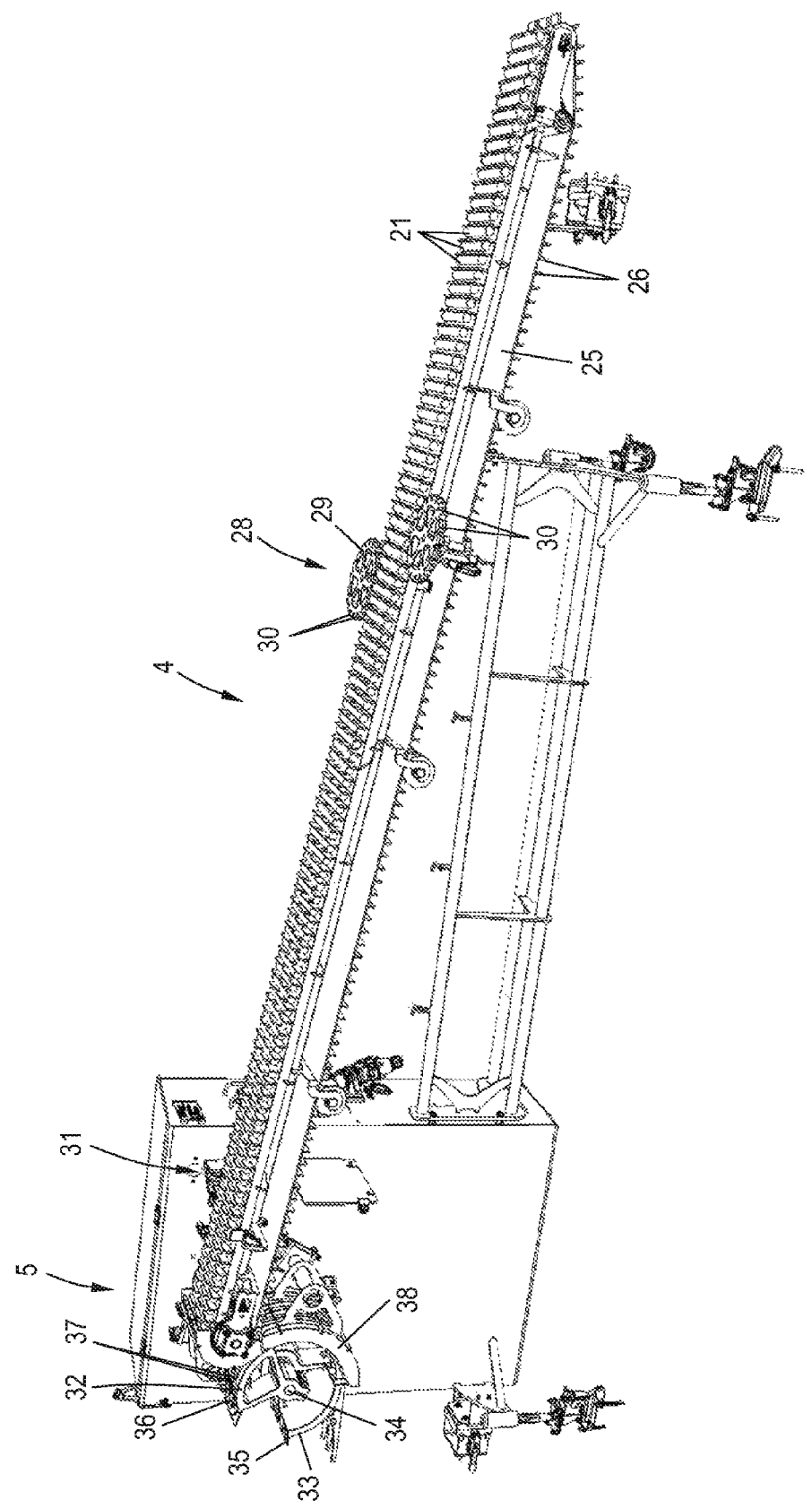
FIG. 8 shows a perspective view of the first conveying device and the downstream grouping device.

FIG. 8 shows an enlarged diagram of the conveying device 4 with the conveyor belt 25, wherein sausages 21 are occupying all of the individual rails 26. The conveyor belt 25 is driven by motors, preferably servo drives (not shown), and the same is obviously also true for the conveyor belt 12 and the pusher device 19.

On the top side of the conveyor belt 25, an orienting device 28 in the form of a two rotating gear-like wheels 29 is provided; the wheels are arranged on the opposite sides of the belt. The rotating wheels 29 preferably comprise projection-like radial orienting sections 30, each of which engages in one of the individual rails 26. These orienting sections guarantee that each sausage 21 is positioned almost perfectly in the center of its own individual rail 26.

A sensor 31 to detect the loading of the individual rails 26 is assigned to the first conveying device 4, i.e., to the conveyor belt 25. This sensor therefore determines whether or not a sausage 21 is present in an individual rail. This information is needed so that the number of sausages can be counted for the grouping process and so that the downstream grouping device 5 can be actuated as required. This grouping device 5, in the example shown here, comprises two drums 32, 33, which rotate around a common axis 34 and are driven by separate drives—again, servo motors, for example. Each drum 32 extends around an angle increment of slightly more than 90°. It comprises one or more lower driver sections 35 and one or more upper driver sections 36. Between these sections, one or more arc-shaped drum sections 37 extend. Assigned to the drums is an arc-shaped guide section 38, which is stationary and is arranged adjacent to the drums 32, 33.

Figure 9:
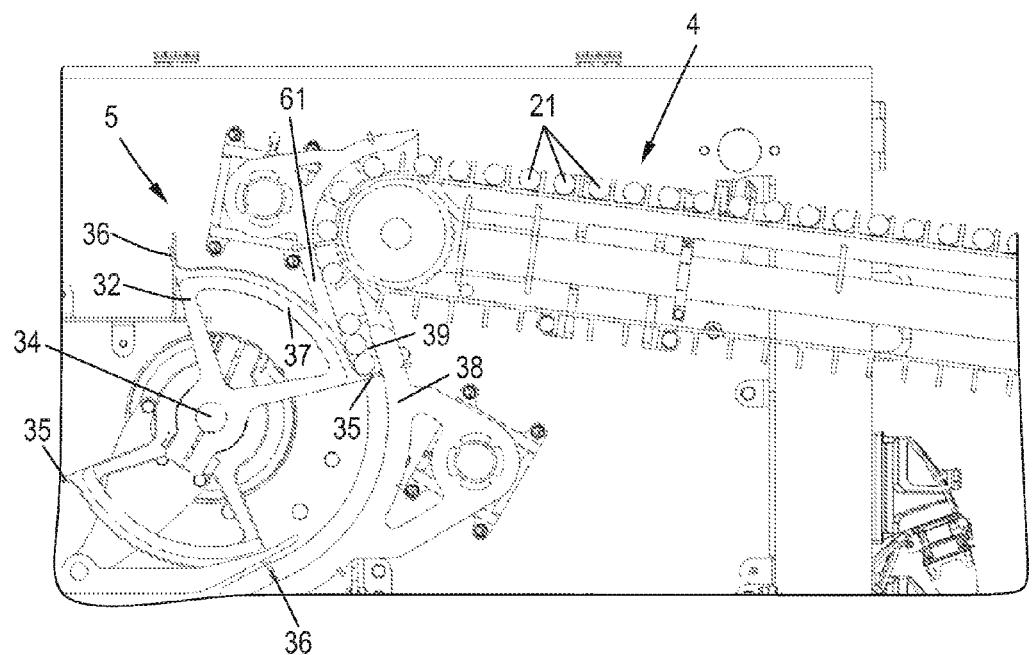
FIG. 9 shows an enlarged detailed, view of the transfer area where the sausages are transferred from the first conveying device to the grouping device.

FIG. 9 shows the process by which the sausages 21 are transferred from the first conveying device 4 to the grouping device 5. In the transfer position, in the example shown here, the drum 32 is already located in a position partially overlapping the arc-shaped guide section 38. The driver 35 serves as a lower sausage support. Between the guide section 38 and the drum sections 37, an arc-shaped receiving channel 39 is formed, as shown in FIG. 9. Into this channel, the individually delivered sausages 21 fall, guided along another stationary section 61, which extends around the conveyor belt 25 in the deflection area and also extends a certain distance toward the drums.

During this loading process, the individual drum—namely, drum 32 in FIG. 9—is rotated stepwise by another certain amount; that is, the associated servo motor moves the drum 32 incrementally further each time a sausage 21 has been received, so that the receiving channel 39 is filled one by one with the required number of sausages. This stepwise movement is controlled on the basis of the sensor 31. That is, by means of this sensor, the loading state of an individual rail 26 is detected. If a rail is not loaded, then necessarily no sausage 21 can be transferred to the receiving channel 39, for which reason the drum 32 is not advanced another step. In addition, the sensor 31 obviously also detects whether or not the required number of sausages has been transferred.

Once the predefined number of sausages has been received in the receiving channel 39, the drum 32 is pivoted downward by the associated drive motor; that is, it moves along the stationary guide section 38. The loaded sausages 21 are carried downward into the arc-shaped receiving channel 39. Any sticking sausage is necessarily carried along by the following driver 36.

Figure 10:
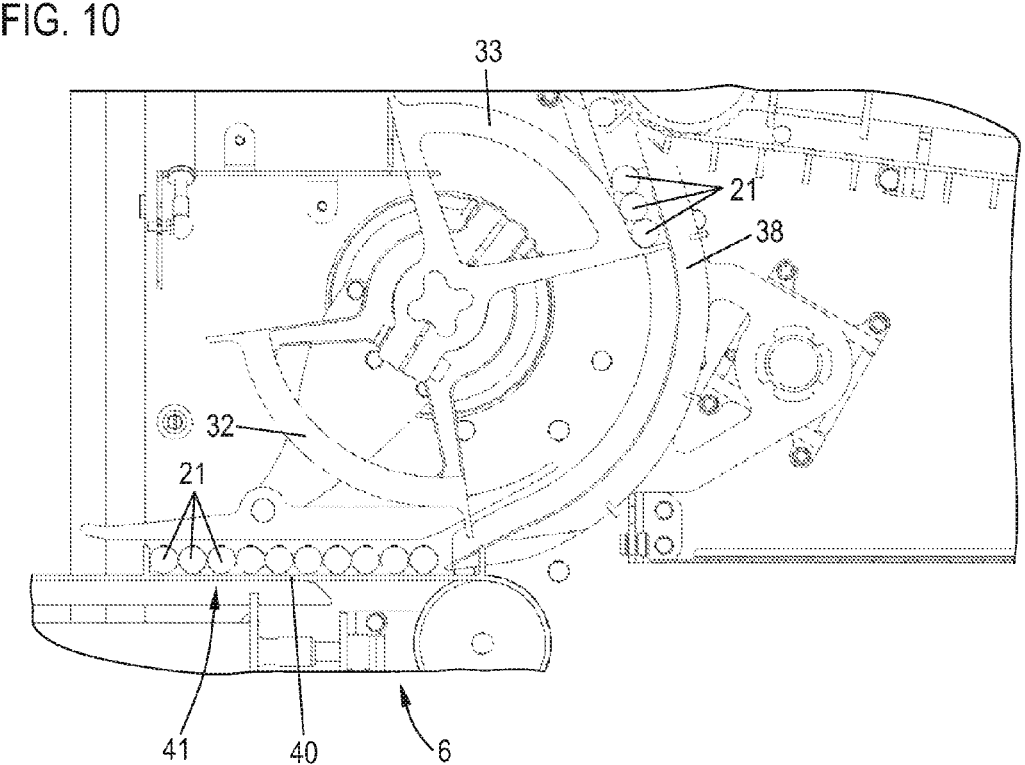
FIG. 10 shows an enlarged, detailed view of the transfer area where the sausages are transferred from the grouping device to the second conveying device.

The arc-shaped guide section 38 leads directly to a point above the second conveying device 6, indicated in FIG. 10. This second conveying device 6 comprises a conveyor belt 40 with a plurality of receiving sections 41 formed on it, into each of which a group of sausages comprising the defined number of sausages 21 is introduced. The conveyor belt 40 is synchronized in its movement with the movement of the drums 32, 33. After the required number of sausages has been loaded into the receiving channel 39 and the drum 32, 33 in question rotates downward, the conveyor belt 40 is then also actuated automatically, so that the receiving section 41 travels into a transfer position. The movements are synchronized so that the individual sausages 21 leave the guide section 38 one after the other and roll into the receiving section 41 one after the other. When the drum just loaded turns down, the second drum is rotated immediately into the receiving position, as shown by way of example in FIG. 9, so that the next group of sausages can be formed. The drums operate independently of each other; i.e., their movements are controlled separately. It is assumed that the drum 32 previously filled as shown in FIG. 9 has been rotated into the unloading position in FIG. 10; that is, the sausages 21 being held by it have just been moved into the receiving section 41, while the second drum 33 has been rotated in to the transfer position.

Figure 11:
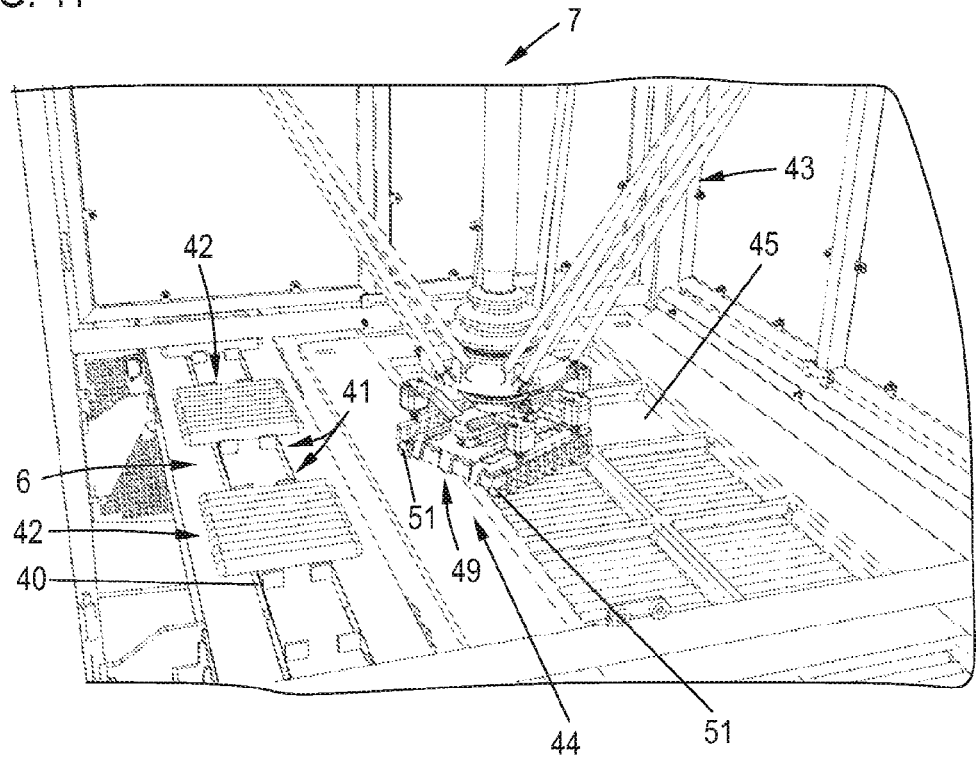
FIG. 11 show a perspective diagram of the transfer device comprising a delta robot.

The second conveying device 6, which is shown again in FIG. 11, comprises, as previously described, a plurality of separate receiving sections 41, which, as FIG. 11 shows, are arranged one behind the other and a certain distance apart. In each there is a group of sausages 42, consisting of the specified number of sausages. The conveying device 6, i.e., the conveyor belt 40, now brings these individual sausage groups 42 into the working area of the transfer device 7, which is configured as a delta robot 43. The way in which a is delta robot works is sufficiently well known and does not have to be explained in detail here.

The transfer device 7, i.e., the delta robot 43, comprises a gripper device 44, which serves to grip the individual sausage groups 42 as a whole and to transfer them, so that they can be placed in individual receiving containers 45, which are then sent to a packaging machine, where the individual sausage groups 42 receiving their final packaging.

For this purpose, the gripper device comprises four gripping elements 46, 47, 48, 49 (compare FIGS. 11 and 12), arranged in rectangular fashion. At least three of these gripping elements 46-49 are pivotable by separate drive motors 50; that is, they can therefore be pivoted toward and away from the sausage group 42. One of the gripping elements can be stationary.

Figure 12:
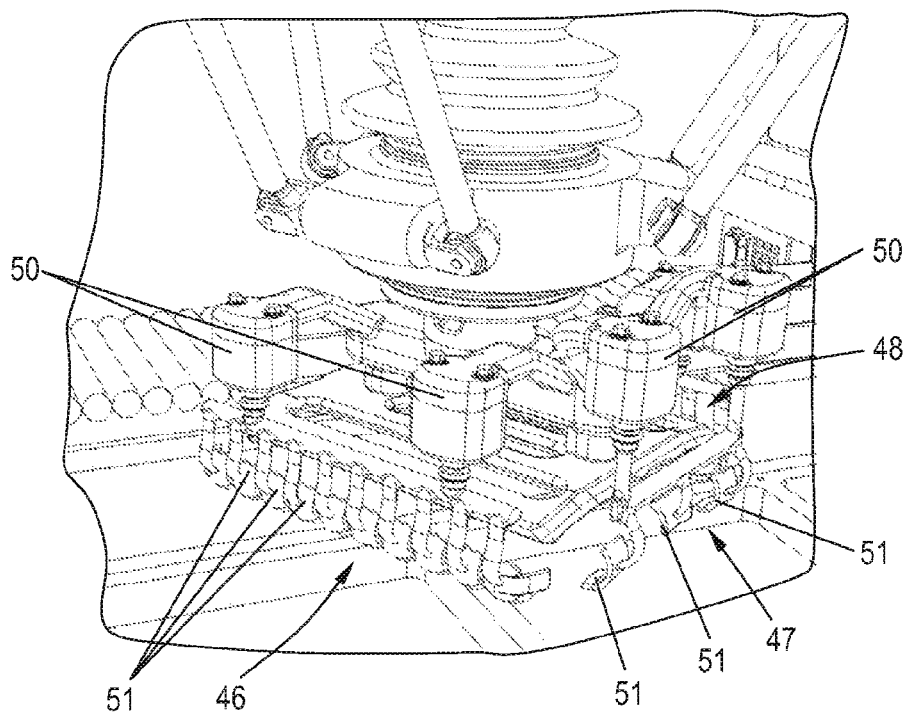
FIG. 12 shows an enlarged diagram of the gripper device of the transfer device of FIG. 11.

Each of the gripping elements comprises a plurality of curved gripping sections 51, as can be seen in FIGS. 11 and 12. The gripping elements 47 and 49 are provided with only a few gripping sections 51—in the example shown here, three gripping sections are provided. These gripping elements 47 and 49 act on the long sides of the sausage group 42, i.e., on the two outside sausages 21. It is sufficient here for the sausages to be gripped only at certain points.

The gripping elements 46 and 48, conversely, comprise a plurality of separate gripping elements 51; the number of gripping elements 51 corresponds to the number of sausages 21 forming the sausage group 42. These gripping elements 51 act on the front and rear ends of the individual sausages 21. That is, each sausage 21 is gripped at its ends by means of the gripping elements 46 and 48, whereas the gripping elements 47 and 49 act only along the length of the two outside sausages 21.

So that a sausage group 42 can be gripped, the gripper device 44 is moved into a position above the sausage group 42. The movable gripping elements are pivoted outward. Then the gripper device 44 is lowered by the delta robot 43. Once the gripping position has been reached, the at least three movable gripping elements are pivoted inward again, so that the sausage group 42 is gripped in the previously described manner. Then the sausage group 42 is raised by the delta robot 43 and moved precisely over a receiving container 45. Once the sausage group 42 has been positioned precisely above a receiving container 45, the gripping device 44 is lowered again. Upon reaching the end position, the movable gripping elements are opened, so that the sausage group 42 is released into the receiving container 45. The opened gripper device then travels back toward the second conveying device 6 to grip and transfer the next sausage group 42. The movement of the relevant components operating here, namely, the second conveying device 6, the delta robot 43, i.e., the gripper device 44, and the receiving containers 45, which are arranged on a suitably adapted conveyor belt, are, of course synchronized with each other.

After the receiving containers 45 have been filled, they are carried away by the conveyor belt on which they are arranged or on the belt of which they form a part and sent to a packaging device, where the final packaging of the sausage groups is carried out.

While specific embodiments of the invention have been shown and described in detail to illustrate the inventive principles, it will be understood that the invention may be embodied otherwise without departing from such principles.

We claim:

1. A device for the treatment of individual sausages, comprising:
    a sorting device comprising an endless conveyor belt traveling around an approximately triangular geometry and equipped with rails or carrier bars, an ascending run of the conveyor belt configured to receive loosely deposited sausages and distribute the sausages individually into the rails or carrier bars;
    an endless first conveying device with individual rails or carrier bars to accept the sorted sausages from the sorting device, wherein each individual rail or carrier bar of the endless first conveying device accommodates one sausage;

a grouping device configured to receive the sausages individually from the first conveying device and combine the sausages into groups, wherein the grouping device comprises at least one drivable drum rotating around an axis perpendicular to the conveying direction of the first conveying device, into which drum the sausages forming one group are individually loaded by the first conveying device and from which drum all of the sausages of the one group are discharged together;

a second conveying device with receiving sections, each accommodating the sausages of one group, and into which the sausages of the one group, lying side by side, are transferred from the grouping device; and a transfer device comprising a gripper device configured to grip the sausages of the one group from the second conveying device and transfer and deposit the sausages of the one group into a receiving container.

2. The device according to claim 1, wherein the sorting device includes a guide device for the sausages held in the carrier bars or rails, which are open at the bottom, the guide device is provided underneath an essentially horizontal lower run of the conveyor belt, the guide device guiding the sausages so that the sausages are transferred to the first conveying device arranged adjacent to the essentially horizontal lower run.

3. The device according to claim 1, wherein the carrier bars or rails of the sorting device are longer than the sausages to be sorted, so that several sausages can be accommodated in a row, one behind the other, in one of the carrier bars or rails of the sorting device, the sorting device further including a pusher device pushing the sausages of along a length of one of the carrier bars or rails for transfer to the first conveying device.

4. The device according to claim 2, wherein the pusher device is an endless belt or strap traveling perpendicularly to a conveying direction of the essentially horizontal lower run.

5. The device according to claim 1, wherein the sorting device comprises a stripper device for stripping sausages from atop the rails or carrier bars of the sorting device.

6. The device according to claim 5, wherein the stripper device is a rotating paddle.

7. The device according to claim 1, wherein an orienting device for laterally positioning the sausages held in the individual rails is assigned to the first conveying device.

8. The device according to claim 7, wherein the orienting device comprises rotating gear-like wheels, one arranged on each side of the first conveying device, equipped with orienting sections which act on the sausages and engage in the individual rails or carrier bars.

9. The device according to claim 1, wherein the grouping device includes two drums which rotate around the same axis, are arranged one after the other, and can be driven separately.

10. The device according to claim 1, wherein an arc-shaped guide section is assigned to the drum, wherein the sausages transferred one by one to the drum line up side by side in a receiving channel defined between the drum and the guide section.

11. The device according to claim 10, wherein the drum rotates in a stepwise manner during the sausage loading process until al the sausages have been loaded, after which the drum rotates further to discharge the one group of sausages.

12. The device according to claim 1, wherein a sensor for detecting the loading state of the individual rails is assigned to the first conveying device, wherein the drive of the drum can be controlled as a function of the detection results.

13. The device according to claim 1, wherein the arc-shaped guide section leads to a point directly above the second conveying device.

14. The device according to claim 1, wherein the transfer device is a delta robot.

15. The device according to claim 14, wherein the gripper device comprises four gripping elements positioned in a rectangular arrangement to grip the sausage group, which has a rectangular outline, wherein at least three gripping elements are pivotable.

16. The device according to claim 15, wherein each of the gripping elements comprises several curved gripping sections.

17. The device according to claim 16, wherein two of the gripping elements arranged opposite each other, act on the ends of the sausages, and comprise a number of gripping sections equal to the number of sausages.

18. The device according to claim 1, wherein the sorting device orients the loosely deposited sausages in a same orientation while distributing the sausages individually into the rails or carrier bars of the sorting device.

* * * * *